United States Patent [19]

Latty

[11] Patent Number: 5,413,359
[45] Date of Patent: May 9, 1995

[54] GASKET

[75] Inventor: Cyril X. Latty, Saint Cloud, France

[73] Assignee: Latty International S.A., Orsay, France

[21] Appl. No.: 114,480

[22] Filed: Aug. 31, 1993

[51] Int. Cl.⁶ .............................................. F16J 15/32
[52] U.S. Cl. .................... 277/180; 277/198; 277/235 R
[58] Field of Search ............ 277/180, 198, 227, 235 R, 277/235 B, 166, 189, 199

[56] References Cited

U.S. PATENT DOCUMENTS

| | | |
|---|---|---|
| 368,189 | 8/1887 | Carter ................................ 277/180 |
| 3,215,442 | 11/1965 | Papenguth ........................ 277/180 |
| 3,279,805 | 10/1966 | Quinson ........................... 277/180 |
| 3,302,953 | 2/1967 | Glasgow .......................... 277/180 |
| 3,355,181 | 11/1967 | Olson ............................... 277/227 |
| 3,811,689 | 5/1974 | Farnam ............................ 277/180 |
| 4,548,165 | 10/1985 | Vorobiev et al. ............. 277/235 B |
| 4,629,199 | 12/1986 | Yamamoto et al. ........... 277/235 B |
| 5,222,744 | 6/1993 | Dennys ............................ 277/180 |

FOREIGN PATENT DOCUMENTS

| | | | |
|---|---|---|---|
| 1042315 | 10/1958 | Germany . | |
| 3320665 | 12/1984 | Germany . | |
| 3542593 | 6/1987 | Germany . | |
| 8901604.1 | 5/1989 | Germany . | |
| 2163496 | 2/1986 | United Kingdom | 277/180 |

OTHER PUBLICATIONS

Burgmann Statische Dichtungen (2 pages) (No date or author available).

Primary Examiner—Daniel G. DePumpo
Attorney, Agent, or Firm—Flynn, Thiel, Boutell & Tanis

[57] ABSTRACT

A gasket including an annular metal core and at least one radially outwardly projecting, compressible gasket ring made of a high-temperature resistant, expanded graphite material. The gasket ring is arranged on the metal core and, after mounting, is essentially aligned with the metal core. The metal core has a circular recess in a form of a V-shaped trough on an outer circumference thereof, into which recess the gasket ring is inserted. The gasket ring is made of a graphite material and has on at least two axially facing side edges adjacent the metal core an inclined slope of approximately 45°. The metal core consists of a high strength metal alloy selected from the group consisting of 304L stainless steel, 316L stainless steel, 321 stainless steel, 329 stainless steel and inconel 600.

2 Claims, 1 Drawing Sheet

GASKET

FIELD OF THE INVENTION

The invention relates to a gasket comprising an annular metal core and at least one radially outwardly projecting and compressible gasket ring made of a high-temperature resistant, expanded graphite material, which gasket ring is arranged on the metal core, with the gasket ring after mounting being essentially aligned with the metal core and the metal core having on its outer circumference a circular recess in a form of a V-shaped trough, into which recess the gasket ring is inserted.

BACKGROUND OF THE INVENTION

A similar gasket is already part of the state of the art. The gasket ring made of graphite material has a greater thickness than the metal core and has essentially a rectangular shape (DE-GM G 89 01 604.1).

SUMMARY OF THE INVENTION

In comparison to this known design, the basic purpose of the present invention is to provide a gasket of the above-mentioned type, which with a simple design exercises a satisfactory sealing function even in the case of the highest of loads.

This purpose is attained according to the invention by the gasket ring being made of a graphite material having a 45° inclined slope on at least two outer axially facing side edges and by the annular metal core consisting of a high strength material according to the AISI norm, in particular 304L, 316L, 321, 329 or INCONEL 600. This special design of the gasket results in a better sealing function, and this gasket satisfactorily meets at the same time its sealing function even at very high loads.

The slope can exist on all four side edges. Furthermore, the slope can extend from a region greater than the thickness of the metal core to a region less than the thickness of the metal core.

BRIEF DESCRIPTION OF THE DRAWING

The invention will be described in greater detail hereinafter in connection with exemplary embodiments illustrated in the drawing.

In the drawing.

DETAILED DESCRIPTION

Figure 1A:
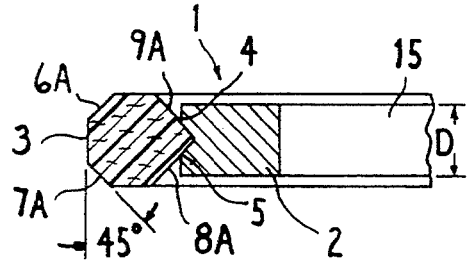
FIG. 1a is a partially broken cross-sectional view of a gasket ring embodying the invention.

FIG. 1 shows the gasket 1 partially broken in a central cross-sectional view, which gasket consists essentially of an annular metal core 2 and at least one radially outwardly projecting and compressible gasket ring 3 arranged on the metal core 2 and which consists of a high-temperature resistant, expanded graphite material. The metal core 2 has a circular recess 5 in the form of a V-shaped trough on its outer circumference 4, into which recess 5 a radially inwardly projecting bead on the gasket ring 3 is inserted.

The gasket ring 3, as can be seen, has an approximately 45° slope A on all four outer side edges 6, 7, 8, 9.

The annular metal core 2 consists of a high strength material according to the AISI norm or standard, in particular 304L, 316L, 321, 329 or inconel 600.

Thus, according to other norms or standards, namely AFNOR and DIN, a correlation exists with respect to the material composition of the metal core and is set forth in the following table of standard materials:

| AISI | AFNOR | DIN |
| --- | --- | --- |
| 304L stainless steel | Z 2 CN 18,10 | 1,4306 |
| 316L stainless steel | Z 2 CND 17-12 | 1,4435 |
| 321 stainless steel | Z 6 CNT 18,10 | 1,4541 |
| 329 stainless steel | Z 4 CND Nb 25,07 | 1,4582 |
| inconel 600 | NC 15 Fe | 2,4816 |

Figure 1B:
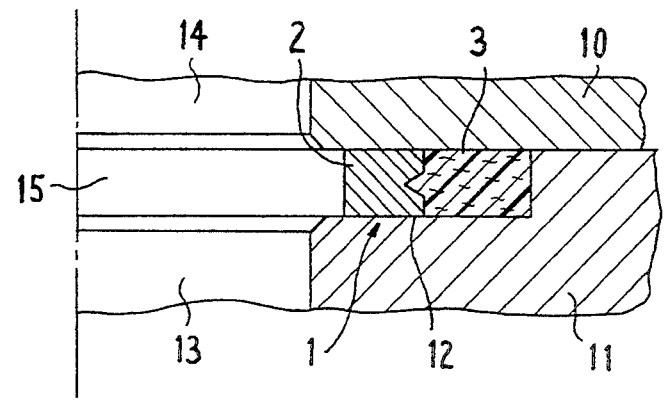
FIG. 1b shows the gasket ring according to FIG. 1a in an installed state.

FIG. 1b shows the gasket of the invention in the installed state. As can be seen, two machine parts 10 and 11 exist, each with a through opening 14 and 13, respectively, therein.

The machine part 11 includes a recess 12 which conforms to the dimensions of the gasket 1 embodying the invention. The recess 12 has a depth which is slightly greater than the thickness D of the metal core 2. The gasket ring 3 in turn has a thickness which, according to FIG. 1a, projects beyond both sides of the metal core 2.

If the gasket 1 of the invention is now moved into the recess 12 of the machine part 1, then the through opening 15 of the gasket 1 is in alignment with the through openings 14 and 13 of the machine parts 10 and 11, respectively. These machine parts 10 and 11 are now clamped to one another thus compressing the gasket ring 3, namely, to the same thickness as the thickness D of the metal core 2.

This compression is surprisingly significantly enhanced by the slopes A between the four outwardly facing side surfaces which define sloped edges 6, 7, 8, 9, namely, the material flows and conforms to the corresponding surfaces of the machine parts 10 and 11. Thus, a very good sealing action results in a very simple manner.

Due to the fact that the metal core 2 consists of a high strength steel material, the gasket 1 is able to satisfactorily meet its sealing requirements even under difficult conditions.

The gasket can be utilized, for example, in the field of nuclear-power technology, in refineries, in safety flanges or safety valves, heat exchangers or other, high strength pipe connections.

Figure 2:
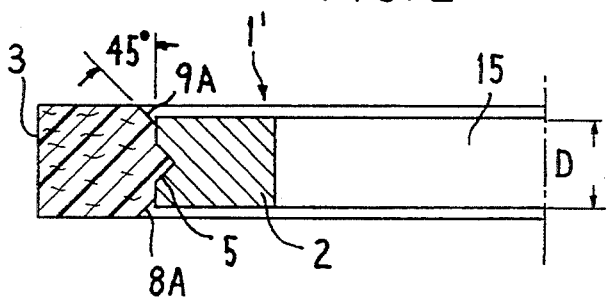
FIG. 2 is a central cross-sectional view of an alternate design of a gasket embodying the invention.

An alternate gasket 1' also embodying this invention is shown in FIG. 2 and is designed such, in the exemplary embodiment so illustrated, that the gasket ring 3 has a sloped surface A at each of two radially inwardly oriented corners which define sloped edges 8, 9. The metal core 2 consists in turn of the aforementioned material; the thickness of the gasket ring 3 is greater than the thickness D of the metal core 2 so that in the installed state, the gasket ring 3 of a high-temperature resistant, expanded graphite material in turn is aligned essentially with the metal core 2.

Figure 3:
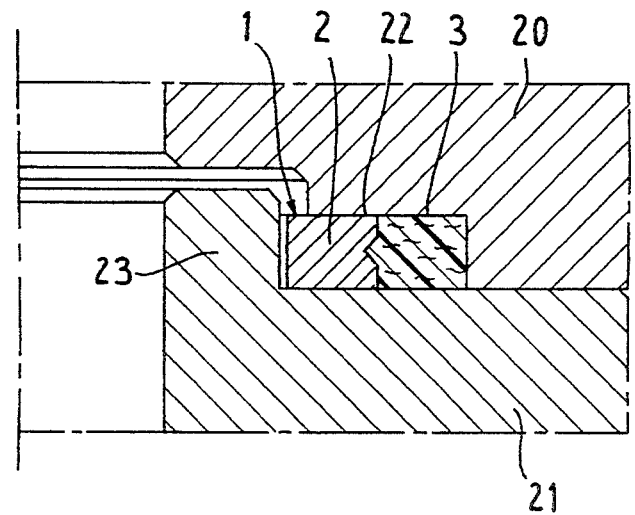
FIGS. 3 and 4 show two possibilities for installing the gasket according to FIG. 2.

Two machined parts 20 and 21 are, in the exemplary embodiment according to FIG. 3, connected to one another by screws, for example, with the machine part 20 having a recess 22 and the machine part 21 having a circular flange 23. The gasket 1 of the invention is inserted in the area bordered by the recess 22 and the flange 23. The machine parts 20 and 21 are thereafter clamped to one another to thus compress the gasket ring 3 causing it to perform a sealing function in cooperation with the metal core 2.

Figure 4:
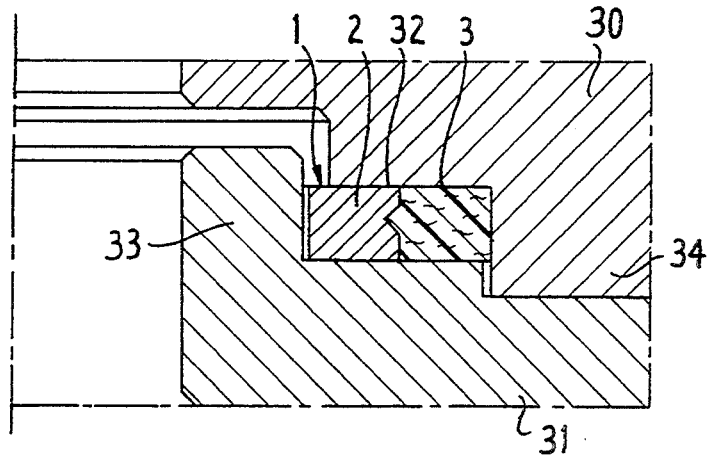

The machine part 30 has, in the embodiment according to FIG. 4, a recess 32; the machine part 31 has a circular flange 33. Furthermore, the machine part 30 has a projecting area 34 which engages a corresponding countersurface of the machine part 31.

The gasket 1 of the invention is inserted into the area bordered by the recess 32 and the flange 33; during the clamping together of the two machine parts 30 and 31, for example by screws, the gasket ring 3 is compressed and thus fulfills its sealing function.

All embodiments of the gasket 1 or 1' of the invention have, in common, an annular metal core 2 made of a high strength material, and a gasket ring 3 made of a high-temperature resistant, expanded, compressible graphite material arranged in such a manner on the metal core that the gasket ring 3 is supported in the circular recess 5. This gasket ring 3 has a 45° slope at at least two corners which define edge surfaces 6, 7, 8, 9.

Furthermore, the thickness of the gasket ring 3 is, in the noncompressed state, greater than the thickness D of the metal core 2. The material of the gasket ring 3 flows during compression until the thickness D of the metal core 2 is essentially reached thus resulting in a very good sealing effect.

The embodiments of the invention in which an exclusive property or privilege is claimed are defined as follows:

1. In a gasket comprising an annular metal core and at least one radially outwardly projecting, compressible gasket ring made of a high-temperature resistant, expanded graphite material, said gasket ring being circumferentially arranged on said metal core, said gasket ring after mounting being essentially aligned with said metal core, said metal core having an annular V-shaped trough on an outer circumference, said gasket ring having a radially inwardly projecting annular bead that is received into said trough, said gasket ring also having planar axially facing sides, a radially outwardly facing circumferential wall and a radially inwardly facing wall concentric with said circumferential wall, the improvement wherein a juncture between each said axially facing sides and at least one of said circumferential wall and said radially inwardly facing wall includes an inclined slope of generally 45°, wherein each said inclined slope extends from a region greater than the thickness of said metal core to a region less than the thickness of said metal core when said gasket ring is in a noncompressed state, and wherein said annular metal core consists of a high strength metal alloy selected from the group consisting of 304L stainless steel, 316L stainless steel, 321 stainless steel, 329 stainless steel and inconel 600.

2. The gasket according to claim 1, wherein said inclined slope is provided between the juncture of each said axially facing sides and each of said circumferential wall and said radially inwardly facing wall.

* * * * *